United States Patent
Chang et al.

(10) Patent No.: US 9,082,009 B2
(45) Date of Patent: Jul. 14, 2015

(54) METHOD OF DEFECT IMAGE CLASSIFICATION THROUGH INTEGRATING IMAGE ANALYSIS AND DATA MINING

(71) Applicant: National Tsing Hua University, Hsinchu (TW)

(72) Inventors: Kuo-Hao Chang, Hsinchu (TW); Chen-Fu Chien, Hsinchu (TW); Ying-Jen Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 24 days.

(21) Appl. No.: 14/154,432

(22) Filed: Jan. 14, 2014

(65) Prior Publication Data

US 2015/0098655 A1    Apr. 9, 2015

(30) Foreign Application Priority Data

Oct. 8, 2013   (TW) .............................. 102136422 A (51) Int. Cl.
*G06K 9/66*      (2006.01)
*G06K 9/00*      (2006.01)

(52) U.S. Cl.
CPC ................................ *G06K 9/00543* (2013.01)

(58) Field of Classification Search
CPC ........... G06T 2207/30148; G06T 2207/20081; G01N 2021/8854; G01N 21/95607; G01N 21/9501; G01N 21/956; G01N 2033/0095; G01N 27/002; G06K 9/6267; G01R 31/312
USPC ....................................................... 382/192
See application file for complete search history.

(56) References Cited

U.S. PATENT DOCUMENTS

2004/0241890 A1*   12/2004   Steele et al. .................... 438/14
2005/0162178 A1*    7/2005   Steele et al. ................... 324/755

* cited by examiner

*Primary Examiner* — Ali Bayat
(74) *Attorney, Agent, or Firm* — Jackson IPG PLLC; Demian K. Jackson (57) ABSTRACT

A method for classifying defect images is provided. Defect images are processed through an automatic optical detection. The present invention integrates image analysis and data mining. Defects are found on the images without using human eye. The defects are classified for reducing product defect rate. Thus, the present invention effectively enhances performance on finding and classifying defects with increased consistency, correctness and reliability.

9 Claims, 5 Drawing Sheets

FIG.5

METHOD OF DEFECT IMAGE CLASSIFICATION THROUGH INTEGRATING IMAGE ANALYSIS AND DATA MINING

TECHNICAL FIELD OF THE INVENTION

The present invention relates to automatic defect detection and classification; more particularly, relates to using defect detection, feature extraction and similarity measurement, and defect classification to automatically analyze defect images obtained after automated optical inspection (AOI), where the defect images are classified through user-defined parameters.

DESCRIPTION OF THE RELATED ART

Color filter is important component in consumer electrical devices, including liquid crystal monitors and camera lens of smart phones and tablets. Producers of color filter usually run a series of sample detections during an out-going quality control (OQC) stage for ensuring quality. The AOI method is one of mechanical visual technologies for detecting surface defect on a wafer, where the detection result will be shown in a gray-scaled image.

Defect patterns are important data for judging possible defect reasons by experts in the field. Following division of labor based on specialization, clarification of responsibility is a big problem to a company. Current method of classification is mainly done by human judgment. However, there are some disadvantages: First, the human eye will be tired and misjudgment may easily happen after a long time. Second, criteria and basis for defect classification are often only in the minds of a small number of domain experts; and human judgment may also easily cause inconsistency on determinations because of different experiences and classification habits of the experts. Besides, because the defect images provided by the company are gray-scaled while the prior art of classification for color filter is mainly for color images, the difficulty level of analysis is increased for the background colors of the images are very close to the defects.

Hence, the prior art does not fulfill all users' requests on actual use.

SUMMARY OF THE INVENTION

The present invention relates to automatic defect classification; more particularly, relates to using defect detection, feature extraction and similarity measurement, and defect classification to automatically analyze defect images obtained after AOI, where the defect images are classified through user-defined parameters.

Another purpose of the present invention is to feed real-time information of final classified defect images back for reducing production error rate.

Another purpose of the present invention is not to rely on human eye, so that effectiveness and performance of defect classification can be enhanced with improved consistency, correctness and reliability of the classification result.

To achieve the above purposes, the present invention is a method of defect image classification through integrating image analysis and data mining, comprising steps of (a) defect detection, (b) feature extraction and similarity measurement, and (c) defect classification, where, in step (a), a plurality of defect images are obtained; and an outline of a first defect of each the defect image are detected with two-stage parameter adjustment to obtain a position, a shape and a size of the first defect in each the defect image; where, in step (b), a plurality of defect patterns are obtained; the defect patterns comprises a pattern of bright white defect, a pattern of gray white massive tiny defect, a pattern of gray black massive tiny defect, a pattern of gray black strip defect, a pattern of black halo defect, a pattern of bubble-shaped large defect, a pattern of false count and a pattern of other defect (OT); a plurality of features of a second defect of each the defect pattern and the same features of the first defect of each the defect image are obtained; the features are a plurality of color features, shape features and statistical features; and the features of the first defect of each the defect image are compared with the same features of the second defect of each the defect pattern to obtain a separate similarity to each the defect pattern to categorize the defect image into at least one of the defect patterns; and where, in step (c), the features of the second defects of all the defect patterns are processed through a classification and regression tree (CART) algorithm to obtain classification rules with Gini indexes for automatically classify the defect images; a result of classified defect images obtained in step (c) is compared with a result of categorized defect images obtained in step (b); and a defect image is classified into the pattern of OT when a defect pattern into which the defect image is classified in step (c) is not identical with any defect pattern into which the defect image is categorized in step (b). Accordingly, a novel method of defect image classification through integrating image analysis and data mining is obtained.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT(S)

The following description of the preferred embodiment is provided to understand the features and the structures of the present invention.

Figure 1:
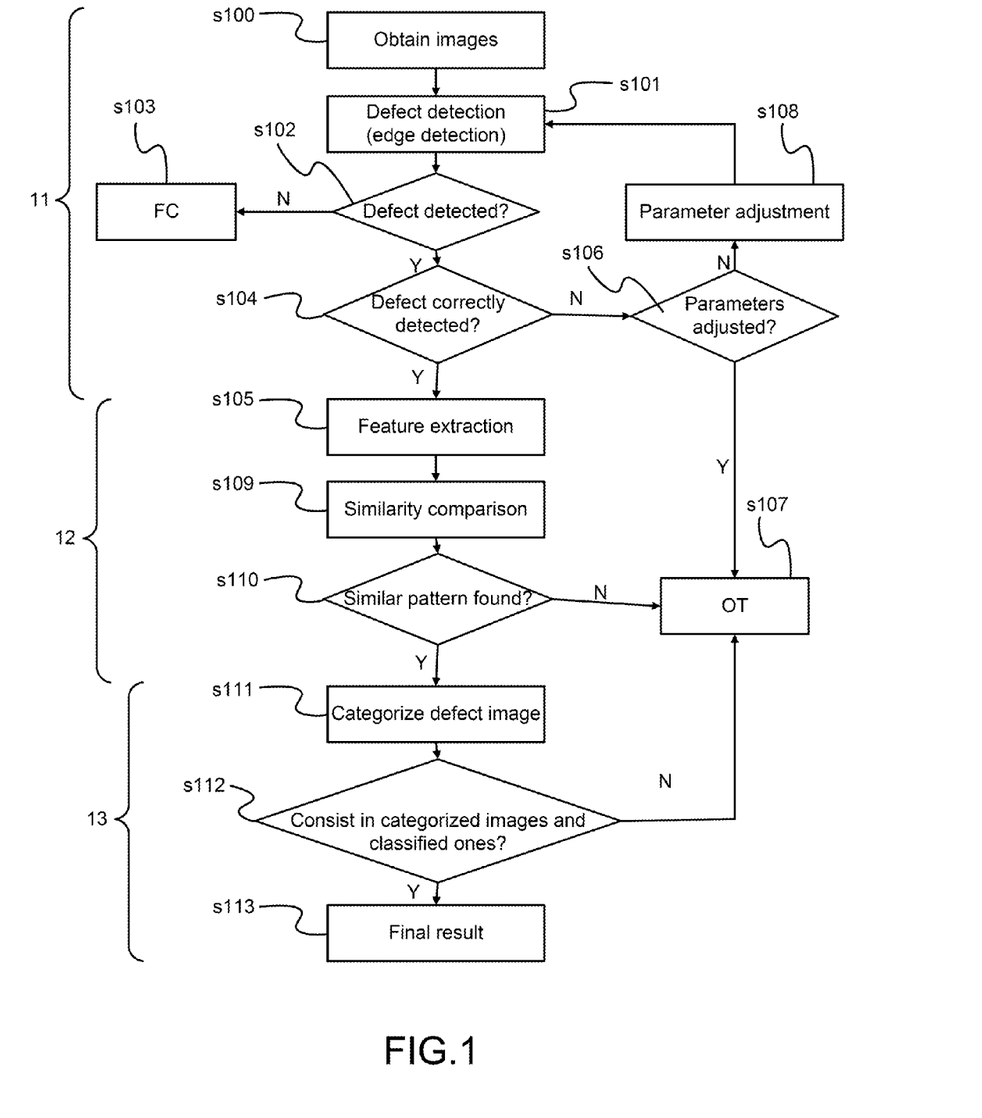
FIG. 1 is the flow view showing the preferred embodiment according to the present invention.

Please refer to FIG. 1 to FIG. 4, which are a flow view showing a preferred embodiment according to the present invention and views showing color values, shape values, and segment nodes of classification rules. As shown in the figures, the present invention is a method of defect image classification through integrating image analysis and data mining, where original defect images having a size of 2352*1722 pixels are directly processed at real time. The present invention comprises three steps: defect detection; feature extraction and similarity measurement; and defect classification. Through the three steps, the gray-scaled defect images generated by a general device of automatic optical inspection (AOI) are automatically classified with user-defined parameters for diminishing reliance on classification through human eye. Thus, consistency, correctness and reliability of classification result are enhanced. The present invention comprises the following steps:

(a) Defect detection 11: A plurality of defect images are obtained, where an outline of a first defect of each the defect image is detected with two-stage parameter adjustment for identifying a position, a shape and a size of the first defect.

(b) Feature extraction and similarity measurement 12: A plurality of defect patterns are defined, comprising a pattern of bright white defect (MC), a pattern of gray white massive tiny defect (MQ), a pattern of gray black massive tiny defect (MN), a pattern of gray black strip defect (MR), a pattern of black halo defect (MT), a pattern of bubble-shaped large defect (WN), a pattern of false count (FC) and a pattern of other defect (OT), as shown in Table 1. A plurality of features of a second defect of each the defect pattern are extract, including a plurality of color values, shape values and statistical values. The same features of the first defect of each defect image are also obtained for similarity comparison. Thus, after the similarity comparison, each the defect image is categorized into at least one of the defect patterns by judging whether the same features of the first defect of the defect image tally with the extracted features of any of the second defects of the defect patterns.

TABLE 1

|  | White (Defect color whiter than background) | Black (Defect color blacker than background) |
|---|---|---|
| Strip defect |  | MR |
| Massive defect | MC, MQ, MT, WN | MT, MN, WN |

(c) Defect classification 13: The features of the second defects of all the defect patterns are processed through a classification and regression tree (CART) algorithm to build classification rules with Gini indexes for classifying the defect images automatically. A result of classified defect images thus obtained is compared with a result of categorized defect images obtained in step (b) to check whether the two results are identical. During the comparing, a defect image, if any, is classified into the pattern of OT when a pattern into which the defect image is thus classified in step (c) is not identical with any defect pattern into which the defect image is categorized in step (b).

In step (a), the two-stage parameter adjustment is done for a Canny edge detection algorithm. The two-stage parameter adjustment uses parameters of Gauss filter, comprising a standard deviation (a) and two thresholds ($T_{LOW}$, $T_{HIGH}$), for enhancing correctness of defect detection. The Canny edge detection algorithm decides a strong edge by an edge value bigger than the $T_{HIGH}$ threshold; removes any edge by the edge value smaller than the $T_{LOW}$ threshold; and finds any weak edge by the edge value between the $T_{HIGH}$ threshold and the $T_{LOW}$ threshold. After detecting the strong edge, the weak edge, if any, neighboring to the strong edge is combined with the strong edge to obtain a final outline of the first defect.

The present invention uses the $T_{LOW}$ threshold as a threshold of the first stage, which is a more flexible value for detecting prominent and big-area defect patterns (MC, MT, WN); and the $T_{HIGH}$ threshold as a threshold of the second stage, which is a more severe value for detecting tiny defect patterns (MQ, MN, MR) and false counts (FC). A rule for detection failure is as follows:

defect area/rectangular vicinity area of the defect <β, where β is 0.001.

If no defect pattern other than the pattern of OT is found for a defect to be categorized in the second stage, the defect may be a multi-defect and is classified into the pattern of OT.

In step (b), the following ten features are defined for categorization. Therein, the first three are color features, the fourth to the sixth are shape features and the last four are statistical features, comprising:

1. a maximum value of all gray-scaled pixels of a defect image;
2. a minimum value of the gray-scaled pixels of the defect image;
3. a range value of the gray-scaled pixels of the defect image, which is obtained by deducting the maximum value by the minimum value;
4. an area value of a defect in the image, which is obtained by binary partitioning in the Canny edge detection algorithm; in the binary partitioning, all pixels belongs to the defect are given value 1 and the other pixels in the image is given value 0; and, thus, an area of the defect can be simply obtained by adding the values of all pixels in the image;
5. an area value of a vicinity rectangle of the defect, which is a smallest rectangle containing the defect;
6. a ratio value of area of the defect to area of the vicinity rectangle;
7. a maximum value of the gray-scaled pixels obtained after enhancement;
8. an average value of the gray-scaled pixels obtained after enhancement;
9. a variance value of the gray-scaled pixels obtained after enhancement; and
10. a skewness coefficient of the gray-scaled pixels obtained after enhancement.

Figure 2:
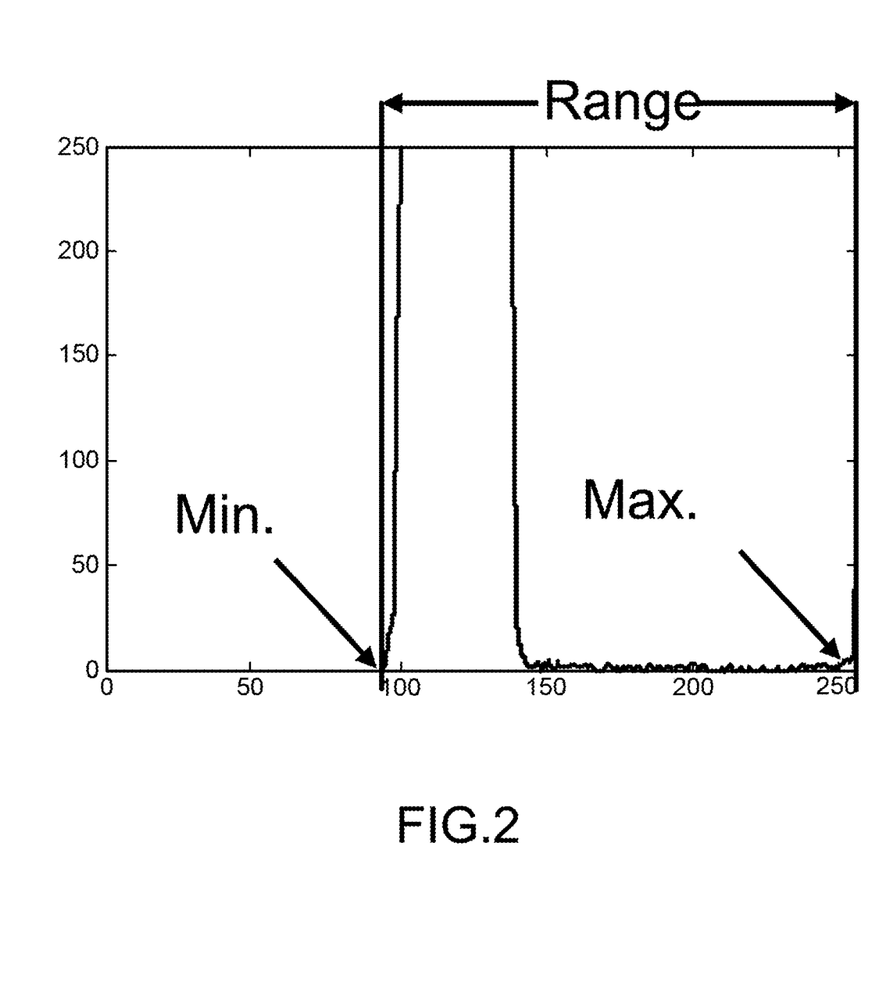
FIG. 2 is the view showing the color values.

Therein, as shown in FIG. 2, because some specific defect patterns have 'bright-light' colored defects, the first three features, which are maximum, minimum and range values of the gray-scaled pixels of the defect image, are obtained.

Figure 3:
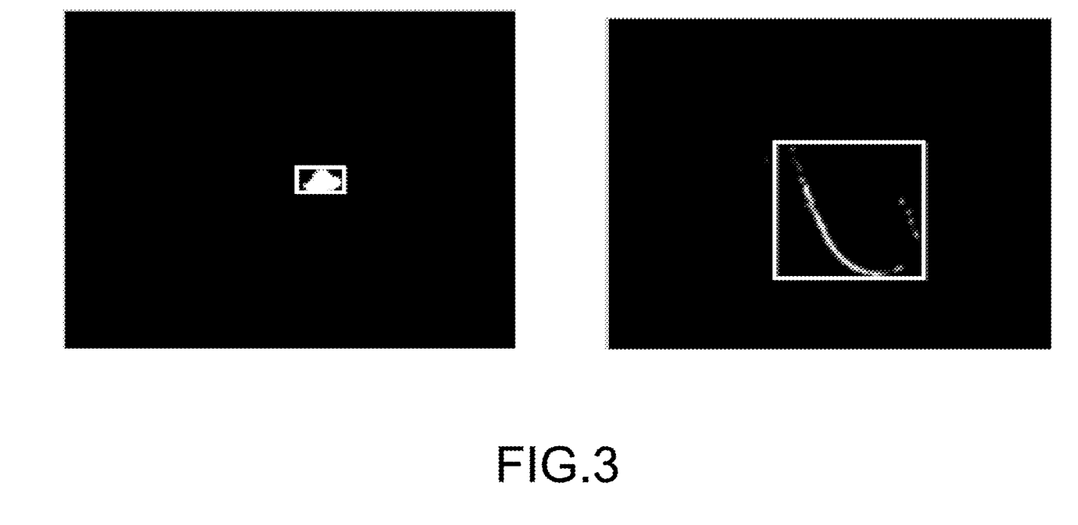
FIG. 3 is the view showing the shape values.

The fourth to the sixth features tells whether the defect is a strip defects or a massive defects, as shown in FIG. 3.

Before calculating the last four features (statistical values of the maximum value, the minimum value, the variance value and the skewness coefficient), the present invention uses a function to enhance original gray-scaled images. Thus, the pixels of the defect in the image are featured out by broadening the value range of the pixels. The function is as follows:

$$f^*(x,y) = [(f(x,y) - f_{min})/(f_{max} - f_{min})] \times 255,$$

where f(x, y) is a value of a gray-scaled pixel at a set of coordinates (x, y) in the image; $f_{max}$ and $f_{min}$ are a maximum and a minimum values of the gray-scaled pixels.

The statistical features are calculated through the following functions, where $x_i$ is the value of the $i^{th}$ gray-scaled pixel and n is a total number of the gray-scaled pixels:

$$\text{average value}(\bar{x}) = \frac{1}{n}\sum_{i=1}^{n} x_i;$$

$$\text{variance value}(s^2) = \frac{1}{n-1}\sum_{i=1}^{n}(x_i - \bar{x})^2; \text{ and}$$

$$\text{Skewness coefficient} = \left[\frac{1}{n}\sum_{i=1}^{n}(x_i - \bar{x})^3\right] \bigg/ \left[\frac{1}{n}\sum_{i=1}^{n}(x_i - \bar{x})^2\right]^{3/2}.$$

The present invention uses two layers of classification for enhancing correctness of classification result. The first classification layer, in step (b), is a classification based on feature values. According to Euclidean distance, the feature values are used for similarity comparison to categorize the defects, comprising the following steps:

(b1) A set of training data of the defect patterns are obtained to extract the above ten features. The ten feature values of each the defect pattern is ascending-sorted by a coefficient of variation (CV) to obtain first t feature values of each the defect pattern. The coefficient of variation (CV) is calculated though a formula as follows:

$$CV = \frac{s}{\bar{x}} \times 100\%.$$

(b2) A similarity measurement of the first t feature values of each the defect image to the first t feature values of each the defect pattern is separately calculated through a formula as follows:

$$\text{similarity measurement}(r) = \sqrt{\sum_{j=1}^{i}\left(\frac{z_j - y_j}{y_j}\right)^2},$$

where $y_j$ is a $j^{th}$ one of the t feature values of the defect pattern and $z_j$ is the same $j^{th}$ one of the t feature values of the defect image.

(b3) A threshold of each the defect pattern is set. The similarity measurement of each the defect image to each defect pattern is compared with the threshold of the corresponding defect pattern for categorizing each the defect image. When the similarity measurement is smaller than the threshold of the corresponding defect pattern, the defect image is categorized into the corresponding defect pattern. When the similarity measurement of the defect image is bigger than all the thresholds of all the defect patterns, the defect image is categorized into the pattern of OT for later manual examination.

Therein, the present invention uses the greatest similarity measurement in the training data as the thresholds of the defect patterns. Since each defect pattern is compared, a defect image may be categorized into different defect patterns.

Figure 4:
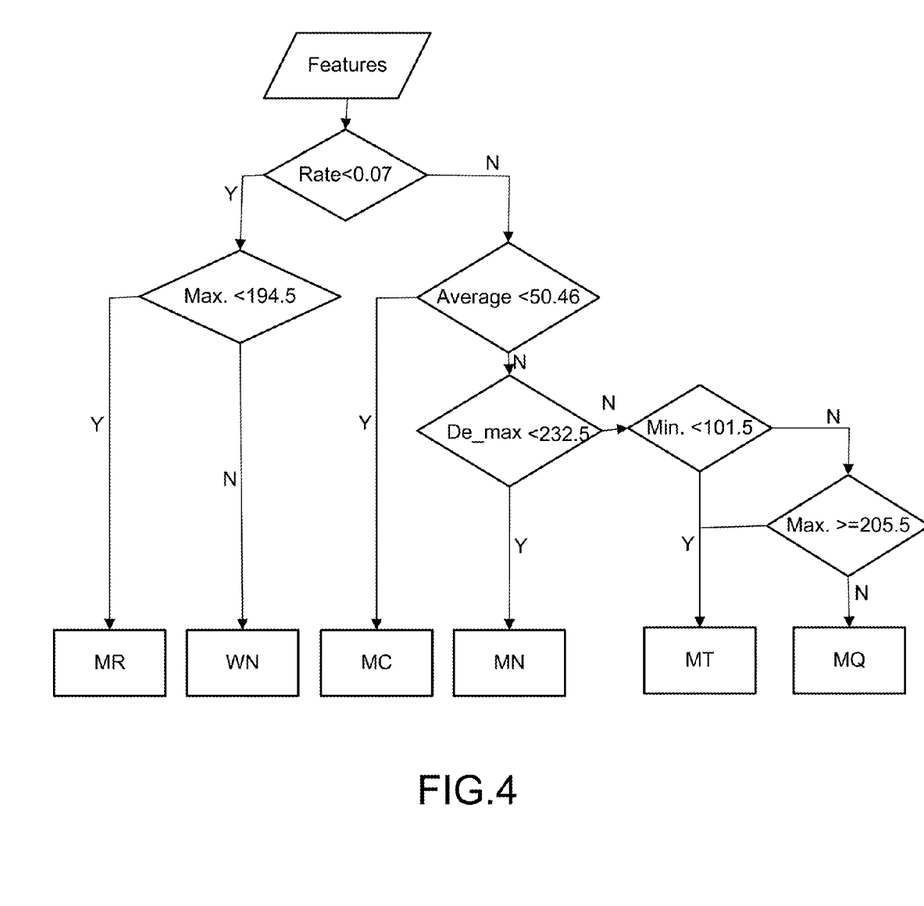
FIG. 4 is the view showing the segment nodes of the classification rules.

The second classification layer, in step (c), is a data-driven CART algorithm. The defect patterns contained in the training data are processed through a recursive segmentation to obtain classification rules with the 10 extracted features of the second defects. Each the classification rule is obtained by optimizing an accuracy rate of classifying each the defect image into only one of the defect patterns and by optimizing a correctness rate of classifying each the defect image with a plurality of segment nodes, as shown in FIG. 4, of the classification rules. Each the segment node and a threshold of the segment node are automatically generated through the CART algorithm. At the same time, each the defect pattern is corresponding to only one of the classification rules. After the classification rules are generated, each the defect image is easily classified into only one of the defect patterns.

The present invention uses the above two layers of classification to decide the final classified defect images. As shown Table 2, the result of the above classification obtained in step (c) is compared with the result of the categorized defect images obtained through similarity comparison in step (b); and the following three situations may happen:

(1) A defect image is not categorized into any defect pattern after similarity comparison; and, then, the defect image is categorized into the pattern of OT.

(2) A defect image is classified into a defect pattern not included in the defect pattern(s) into which the defect image is categorized. In this situation, the defect image is also categorized into the defect pattern of OT for later manual examination.

(3) A defect image is classified into a defect pattern included in the defect pattern(s) into which the defect is categorized. In this situation, the defect image is classified into the same defect pattern without changing.

TABLE 2

| Categorized result | Classified result | Final result |
|---|---|---|
| None | — | OT |
| MC, MQ | MR | OT |
| MC, MQ | MC | MC |

Indexes for verifying the classification result include an overall correctness rate, a catching rate and a false alarm rate, as shown in Table 3 for examples of MC and MQ:
overall correctness rate=$(n_{11}+n_{22})/(n_{11}+n_{12}+n_{21}+n_{22})$;
MC catching rate=$(n_{11})/(n_{11}+n_{12})$; and
MC false alarm rate=$(n_{21})/(n_{11}+n_{21})$.

TABLE 3

| | Classified pattern (column) | |
|---|---|---|
| Real pattern (row) | MC | MQ |
| MC | $n_{11}$ | $n_{12}$ |
| MQ | $n_{21}$ | $n_{22}$ |

Thus, a novel method of defect image classification through integrating image analysis and data mining is obtained.

As shown in FIG. 1, on using the present invention, each defect image is preprocessed for enhancing classification performance in step s100. The preprocessing includes image segregation, image enhancement, etc. The image of the defect in the defect image may have white area around and the white area is disregarded for analysis. Hence, in step s101, a two-stage Canny edge detection algorithm is used for defect detection, which is an edge detection to detect defect outline for identifying a position, a shape and a size of the defect and for further defining the defect pattern of the defect. In step s102, if no defect is detected out, the defect image is all black and belongs to false count to enter step s103. If a defect is detected out, step s104 is processed to judge whether the detection result is correct. In step s104, if the defect is correctly detected out, step s105 is processed for feature extraction. Or, if not, the defect area may occupy too small part (0.001) of its vicinity rectangle and may be a multi-defect. In this situation, step s106 is processed to check whether parameters have been changed. In step s106, if the parameters have been changed, step s107 is further processed to classify the defect into the pattern of OT. Or else, step s108 is processed to re-enter step s101 for defect detection again. In step s105, values of color features, shape features and statistical features are extracted. In step s109, the features are used for similarity comparison. In step s110, the result of the similarity comparison is checked. If the feature values do not meet any criteria of the features of the defect patterns and so the similarity comparison fails, step s107 is further processed to classify the defect into the pattern of OT. If the similarity comparison is successful, step s111 is further processed. Therein, the extracted features of the defect patterns are processed through the CART algorithm to build the classification rules with Gini indexes. At last, step s112 is processed to check whether the classification result obtained in step s111 is in agreement with the result of the similarity comparison obtained in step s109. If they are not agreed, step s107 is further processed to classify the defect image into the pattern of OT. If they are agreed, step s113 is further processed and the defect image remains in the same defect pattern into which the defect is already classified in step s111. Thus, the present invention is finished.

Please refer to FIG. 4, which is a view showing a result of defect detection. As shown in the figure, a plurality of images is obtained for analysis. As shown table 4, a set of defect images is used as training data; and another set of defect images is for testing effectiveness of classification rules. With the defect images, the effectiveness of the present invention is verified.

TABLE 4

| Defect pattern | Number of training images | Number of verifying images |
|---|---|---|
| MC | 50 | 70 |
| MQ | 50 | 70 |
| MR | 53 | 70 |
| MN | 45 | 40 |
| MT | 22 | 10 |
| WN | 7 | 7 |
| FC | 0 | 28 |
| OT | 0 | 20 |

Parameters for two-stage detections are set in Table 5 as follows:

TABLE 5

| First-stage detection | Value | Second-stage detection | Value |
|---|---|---|---|
| σ | 3 | σ | 3 |
| $T_{LOW}$ | 0.55 | $T_{LOW}$ | 0.7 |
| $T_{HIGH}$ | 0.7 | $T_{HIGH}$ | 0.9 |
| β | 0.001 | β | 0.001 |

Figure 5:
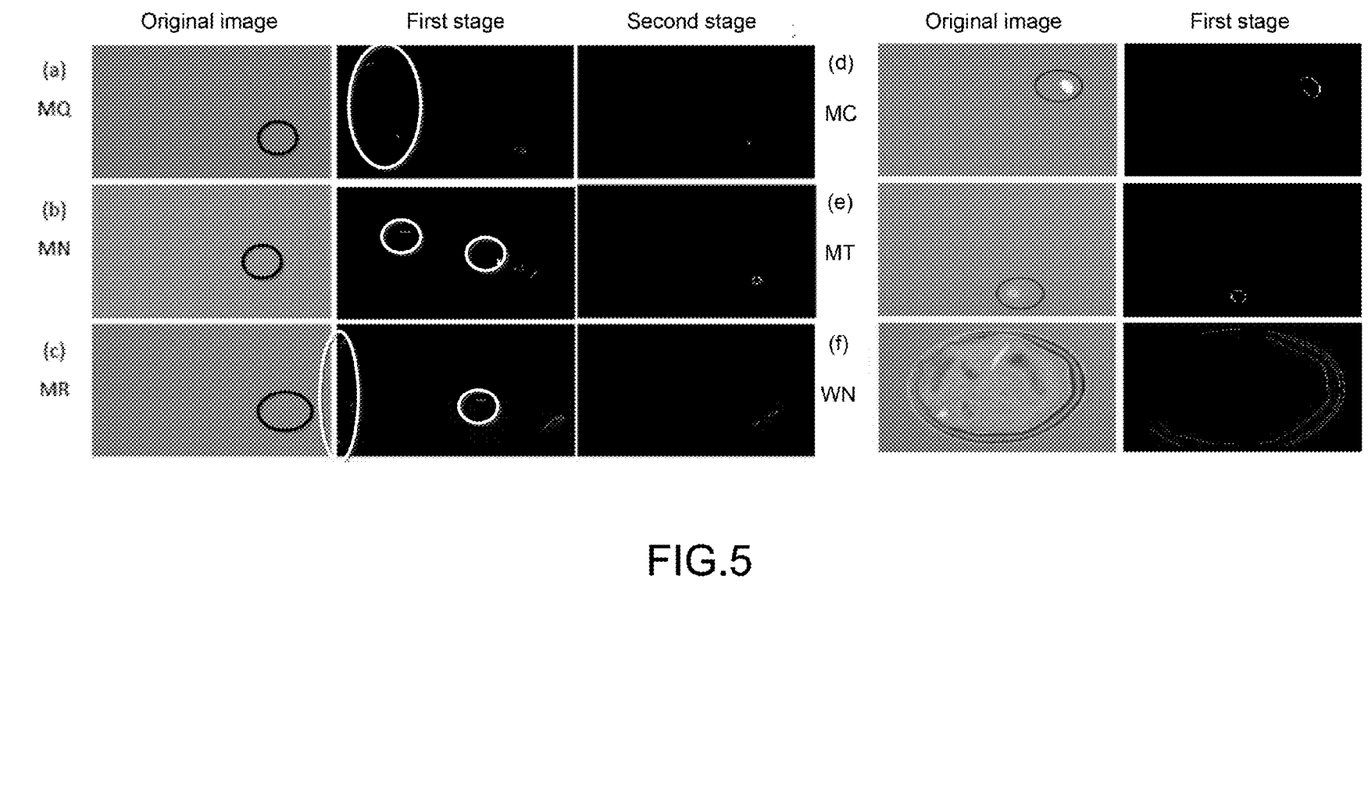
FIG. 5 is the view showing the results of the defect detection.

As shown in FIG. 5, images not correctly detected in the first stage are correctly detected in the second stage. In the first stage, MC, MT and WN are correctly detected but MQ, MN and MR are not. However, in the second stage, they are all correctly detected, as shown in Table 6:

TABLE 6

| | Defect pattern | | | | | |
|---|---|---|---|---|---|---|
| Stage | MC | MQ | MT | MR | MN | WN |
| $1^{st}$ | 100% | 80% | 100% | 86% | 82% | 100% |
| $2^{nd}$ | 100% | 100% | 100% | 100% | 100% | 100% |

During feature extraction, feature values comprising shape values and gray-scaled pixel values are extracted. The pixel values are directly obtained, but the shape values are obtained through detection. In Table 7, statistical values of defect patterns are shown, comprising average values and coefficients of variation (CV). The smaller the coefficient of variation (CV), the more proper to be used as a typical feature value for classification. And, vice versa.

TABLE 7

| | Defect pattern | | | | | |
|---|---|---|---|---|---|---|
| Feature | MC | MN | MQ | MR | MT | WN |
| Max. value | 242.62 | 153.67 | 168.8 | 155.38 | 205.4 | 235.1 |
| | (0.06) | (0.075) | (0.11) | (0.07) | (0.21) | (0.08) |
| Min. value | 110.72 | 112.13 | 113.26 | 115.16 | 89.59 | 69 |
| | (0.04) | (0.09) | (0.06) | (0.06) | (0.21) | (0.7) |
| Range value | 131.9 | 41.533 | 55.54 | 40.20 | 115.81 | 166.14 |
| | (0.12) | (0.16) | (0.3) | (0.15) | (0.46) | (0.41) |
| Area | 29.24 | 29.97 | 29.82 | 162.62 | 61.72 | 775.42 |
| | (0.39) | (0.27) | (0.19) | (0.45) | (0.66) | (0.59) |
| Ratio | 0.2361 | 0.2145 | 0.218 | 0.0342 | 0.1512 | 0.0112 |
| | (0.16) | (0.16) | (0.1) | (0.42) | (0.32) | (1.35) |
| Rectangle | 147.48 | 148.5333 | 140.48 | 6911.962 | 535.1818 | 150955.7 |
| | (1.07) | (0.44) | (0.32) | (1.41) | (0.9) | (1.29) |
| Aver. value | 38.84 | 147.60 | 103.50 | 142.71 | 102.06 | 112.83 |
| | (0.14) | (0.09) | (0.21) | (0.06) | (0.36) | (0.17) |
| Var. value | 59.98 | 632.37 | 424.96 | 757.09 | 136.22 | 781.03 |
| | (0.35) | (0.23) | (0.45) | (0.16) | (0.77) | (1.04) |
| Dev. coefficient | 0.14637 | −0.43836 | −0.41411 | −0.49906 | 0.135291 | −0.45273 |
| | (9.37) | (0.45) | (0.44) | (0.39) | (7.71) | (3.26) |
| De_max | 255 | 191.68 | 253.88 | 209.24 | 251.72 | 243.85 |
| | (0) | (0.11) | (0.01) | (0.1) | (0.02) | (0.05) |

As shown in Table 8, during similarity comparison, 5 feature values of each defect pattern are selected by ascending-sorting the coefficients of variation (CV). A parameter $r_T$ is also decided. When $r_T$ is small, the pattern of OT will have a higher overall correctness rate for classification. On the contrary, when $r_T$ is big, a higher false alarm rate will get but all defect images can be successfully classified. Hence, the biggest value of $r_T$ is selected during a training stage for each defect pattern, where $r_T$ is used as a threshold for classifying each defect image into defect pattern.

TABLE 8

| Defect pattern | | 1 | 2 | 3 | 4 | 5 | |
|---|---|---|---|---|---|---|---|
| | Feature | De_max | Max. | Min. | Range | Aver. | $r_T$ |
| MC | Average | 255 | 110.72 | 242.62 | 131.9 | 38.84 | 0.38 |
| | Dev. Coe. | 0 | 0.04 | 0.06 | 0.12 | 0.14 | |
| MN | Average | 191.68 | 112.13 | 153.67 | 41.53 | 147.60 | 0.62 |
| | Dev. Coe. | 0.11 | 0.09 | 0.07 | 0.16 | 0.09 | |
| MQ | Average | 253.88 | 113.26 | 0.21 | 168.8 | 29.82 | 0.47 |
| | Dev. Coe. | 0.01 | 0.06 | 0.1 | 0.11 | 0.19 | |
| MR | Average | 209.24 | 115.16 | 155.38 | 40.2 | 142.71 | 0.59 |
| | Dev. Coe. | 0.1 | 0.06 | 0.07 | 0.15 | 0.06 | |
| MT | Average | 251.72 | 89.59 | 205.4 | 0.15 | 102.06 | 0.97 |
| | Dev. Coe. | 0.02 | 0.21 | 0.21 | 0.32 | 0.36 | |
| WN | Average | 243.85 | 69 | 235.14 | 166.14 | 775.42 | 0.96 |
| | Dev. Coe. | 0.05 | 0.7 | 0.08 | 0.41 | 0.59 | |

As shown in FIG. 9, during defect classification, main typical feature values are an area ratio of defect to its vicinity rectangle; a maximum pixel value; a minimum pixel value; a maximum value of enhanced pixel; and an average value of enhanced pixels. The overall correctness rate reaches 95 percents (%) after using the training data.

TABLE 9

| Defect pattern | MC | MN | MQ | MR | MT | WN | Catching rate |
|---|---|---|---|---|---|---|---|
| MC | 49 | 0 | 0 | 0 | 1 | 0 | 98% |
| MN | 0 | 43 | 0 | 0 | 2 | 0 | 95.5% |
| MQ | 1 | 0 | 46 | 0 | 3 | 0 | 92% |
| MR | 0 | 0 | 0 | 53 | 0 | 0 | 100% |
| MT | 1 | 0 | 2 | 0 | 19 | 0 | 86% |
| WN | 0 | 0 | 0 | 0 | 0 | 7 | 100% |
| False alarm rate | 3.92% | 0 | 4.16% | 0 | 24% | 0 | |

Another set of defect images are used for testing correctness of classification rules. As shown in FIG. 10, overall correctness rate reaches 94%. In the result, MT has the lowest rate; WN runs the second low; and, MC, MQ, MR and MN reach more than 90%. The overall correctness rate of the pattern of FC is 78%, which is affected by light source and parameter setups.

The present invention is an automatic defect classification method, comprising three steps: defect detection; feature extraction and similarity measurement; and defect classification. For defect images (mainly their sensing areas) obtained after AOI detection, they are automatically analyzed and classified with user-defined parameters. At first, an image analysis is processed for defect detection (Canny edge detection). After picking out a defect in each image, different feature values related to the defect are extracted. Through similarity comparison between defect images and defect patterns with the feature values, the user-defined defect patterns are verified for categorizing the defect images. At last, with the classification rules built by using a CART algorithm, the defect images are automatically classified. Yet, some defect images, which are neither categorized through the similarity comparison nor classified by the CART algorithm effectively and correctly, are thus classified into a pattern of OT. Real-time information of the final classified defect images are fed back for reducing production error rate. Thus, the effectiveness and performance of defect classification is enhanced with improved consistency, correctness (over 94%) and reliability of the classification result for further increasing the production yield rate.

TABLE 10

| Defect pattern | MC | MN | MQ | MR | MT | WN | FA | OT | Catching rate |
|---|---|---|---|---|---|---|---|---|---|
| MC | 70 | 0 | 0 | 0 | 0 | 0 | 0 | 0 | 100% |
| MN | 0 | 37 | 0 | 3 | 0 | 0 | 0 | 0 | 92% |
| MQ | 0 | 0 | 68 | 0 | 2 | 0 | 0 | 0 | 97% |
| MR | 0 | 0 | 0 | 70 | 0 | 0 | 0 | 0 | 100% |
| MT | 0 | 0 | 1 | 0 | 7 | 0 | 0 | 2 | 70% |
| WN | 0 | 0 | 0 | 0 | 0 | 6 | 0 | 1 | 86% |
| FC | 0 | 1 | 0 | 2 | 1 | 0 | 22 | 2 | 78% |
| OT | 2 | 0 | 0 | 0 | 0 | 2 | 0 | 16 | 80% |
| False alarm rate | 2% | 2% | 1% | 6% | 30% | 25% | 0% | 23% | |

To sum up, the present invention is a method of defect image classification through integrating image analysis and data mining, where the present invention does not rely on human eye for defect detection; and effectiveness and performance of defect classification are enhanced with improved consistency, correctness and reliability of the classification result.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of defect image classification through integrating image analysis and data mining, comprising steps of:
    (a) defect detection,
        wherein a plurality of defect images are obtained; and an outline of a first defect of each said defect image are detected with two-stage parameter adjustment to obtain a position, a shape and a size of said first defect in each said defect image;
    (b) feature extraction and similarity measurement,
        wherein a plurality of defect patterns are obtained; and said defect patterns comprises a pattern of bright white defect (MC), a pattern of gray white massive tiny defect (MQ), a pattern of gray black massive tiny defect (MN), a pattern of gray black strip defect (MR), a pattern of black halo defect (MT), a pattern of bubble-shaped large defect (WN), a pattern of false count (FC) and a pattern of at least one other defect (OT);
        wherein a plurality of features of said second defect of each said defect pattern and the same features of said first defect of each said defect image are obtained; and said features are a plurality of color features, shape features and statistical features; and
        wherein said features of said first defect of each said defect image are compared with the same features of said second defect of each said defect pattern to obtain a separate similarity to each said defect pattern to categorize said defect image into at least one of said defect patterns; and
    (c) defect classification,
        wherein said features of said second defects of all said defect patterns are processed through a classification and regression tree (CART) algorithm to obtain classification rules with Gini indexes to automatically classify said defect images; a result of classified defect images obtained in step (c) is compared with a result of categorized defect images obtained in step (b); and
        a defect image is classified into said pattern of OT when a defect pattern into which said defect image is classified in step (c) is not identical with any defect pattern into which said defect image is categorized in step (b).

2. The method according to claim 1,
wherein said two-stage parameter adjustment is done through a Canny edge detection algorithm; parameters of Gauss filter are obtained in said two-stage parameter adjustment; and said parameters of Gauss filter comprises a standard deviation ($\sigma$) and two thresholds ($T_{LOW}$, $T_{HIGH}$);
wherein said threshold of $T_{LOW}$ is obtain in a first stage of two-stage parameter adjustment to detect prominent and big-area defect patterns (MC, MT, WN); said threshold of $T_{HIGH}$ is obtain in a second stage of said two-stage parameter adjustment to detect tiny defect patterns (MQ, MN, MR) and false counts (FC); and
wherein said defect image is categorized into said pattern of OT in step (b) when a ratio of area of said first defect of said defect image to area of a vicinity rectangle of said first defect of said defect image is smaller than 0.001.

3. The method according to claim 2,
wherein said Canny edge detection algorithm obtains a strong edge by an edge value bigger than said $T_{HIGH}$ threshold; removes any edge by said edge value smaller than said $T_{LOW}$ threshold; and obtains any weak edge by said edge value between said $T_{HIGH}$ threshold and said $T_{LOW}$ threshold; and
wherein, after detecting said strong edge, said weak edge neighboring to said strong edge is combined with said strong edge to obtain a final outline of said defect.

4. The method according to claim 1,
wherein, in step (b), said color values comprises a maximum value of all gray-scaled pixels; a minimum value of said gray-scaled pixels; and a range value of said gray-scaled pixels.

5. The method according to claim 1,
wherein, in step (b), said shape values comprises an area value of a defect; an area value of a vicinity rectangle of said defect; and a ratio value of area of said defect to area of said vicinity rectangle; and
wherein said shape values are obtained to identify said defect as a specific defect selected from a group consisting of a strip defect and a massive defect.

6. The method according to claim 1,
wherein, in step (b), said statistical values comprises a maximum value of all gray-scaled pixels; an average value of said gray-scaled pixels; a variance value of said gray-scaled pixels; and a skewness coefficient of said gray-scaled pixels;
wherein, before said maximum value, said average value, said variance value and said skewness coefficient are obtained, said gray-scaled pixels are enhanced by enlarging a value range of said gray-scaled pixels; and
wherein said value range is enhanced by a function as follows:

$$f^*(x,y) = [(f(x,y) - f_{min})/(f_{max} - f_{min})] \times 255; \text{ and}$$

wherein $f(x, y)$ is a gray-scaled value at coordinates system $(x, y)$; $f_{max}$ is a maximum value of said gray-scaled pixels; and $f_{min}$ is a minimum value of said gray-scaled pixels.

7. The method according to claim 6,
wherein said average value, said variance value and said skewness coefficient are obtained through the following formulas:

$$\text{average value}(\bar{x}) = \frac{1}{n}\sum_{i=1}^{n} x_i;$$

$$\text{variance value}(s^2) = \frac{1}{n-1}\sum_{i=1}^{n}(x_i - \bar{x})^2; \text{ and}$$

$$\text{Skewness coefficient} = \left[\frac{1}{n}\sum_{i=1}^{n}(x_i - \bar{x})^3\right] \Big/ \left[\frac{1}{n}\sum_{i=1}^{n}(x_i - \bar{x})^2\right]^{3/2};$$

and wherein $x_i$ is a gray-scaled value; and n is a total number of all said gray-scaled pixels.

8. The method according to claim 1,
wherein, in step (b), said corresponding features of said first and second defects of said defect images and patterns are processed through a similarity comparison to categorize said defect images; and said similarity comparison comprises steps of:
  (b1) obtaining a set of training data of said defect patterns; obtaining a plurality of feature values of each said defect pattern; and ascending-sorting said feature values of each said defect pattern by a coefficient of variation (CV) to obtain first t ones of said feature values of each said defect pattern,
    wherein the coefficient of variation (CV) is obtained through a formula as follows:

$$CV = \frac{s}{\bar{x}} \times 100\%;$$

and
    wherein s is a standard deviation of all gray-scaled pixels and x is a mean value of said gray-scaled pixels;
  (b2) separately calculating a similarity measurement of said first t feature values of each said defect image to said corresponding first t feature values of each said defect pattern through a formula as follows:

$$\text{similarity measurement} = \sqrt{\sum_{j=1}^{t} \left(\frac{z_j - y_j}{y_j}\right)^2},$$

wherein $y_j$ is a $j^{th}$ one of said t feature values of said defect pattern and $z_j$ is said corresponding $j^{th}$ one of said t feature values of said defect image; and
  (b3) defining a threshold of each said defect pattern; and comparing said corresponding similarity measurement of each said defect image with said threshold of each said defect pattern to categorize each said defect image,
    wherein said defect image is categorized into one of said defect patterns when one of said similarity measurements of said defect image to one of said defect patterns is smaller than said threshold of said corresponding one of said defect patterns; and
    wherein said defect image is categorized into said pattern of OT when said similarity measurements of said defect image are bigger than said thresholds of all said defect patterns.

9. The method according to claim 1,
wherein, in step (c), said defect patterns contained in a set of training data are processed through a recursive segmentation to obtain said classification rules with said features of said second defect;
wherein each said classification rule is obtained by optimizing an accuracy rate of classifying each said defect image into only one of said defect patterns and by optimizing a correctness rate of classifying each said defect image with a plurality of segment nodes of said classification rules; and
wherein each said segment node and a threshold of each said segment node are automatically obtained through said CART algorithm; each said defect pattern is corresponding to only one of said classification rules; and, after said classification rules are obtained, each said defect image is classified into only one of said defect patterns.

* * * * *